July 28, 1959     J. A. LIGHTBOURN     2,896,940
COIL SPRING LOWERING AND STABILIZING DEVICES
Filed Aug. 29, 1958     2 Sheets-Sheet 1

INVENTOR.
JOSE A. LIGHTBOURN
BY
McMorrow, Berman & Davidson
ATTORNEYS

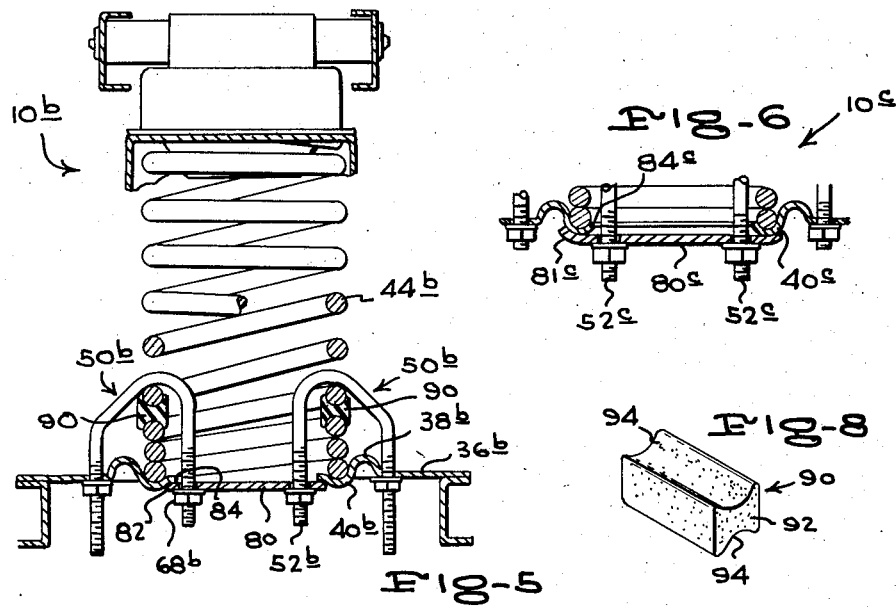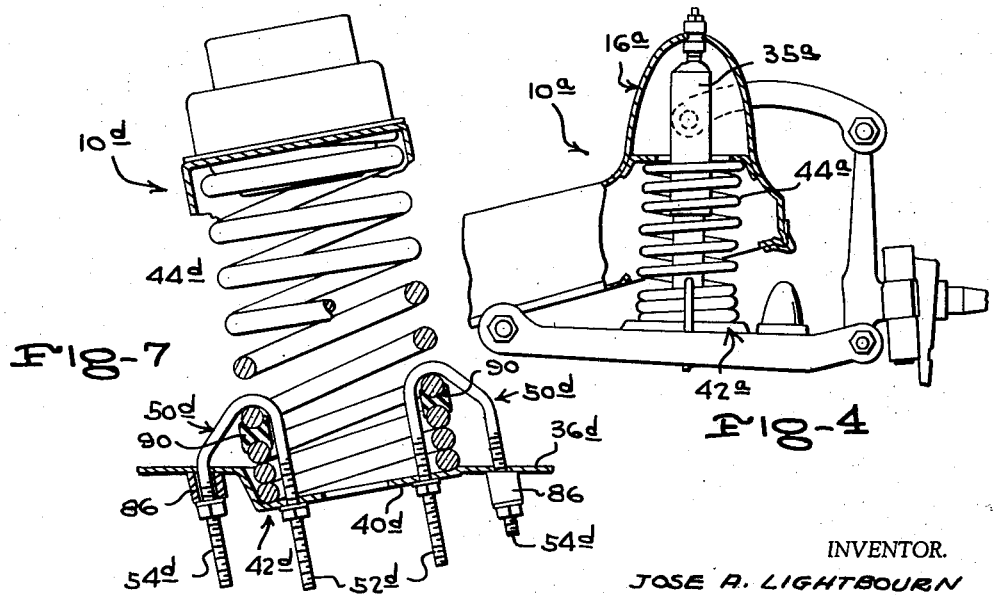

United States Patent Office 2,896,940
Patented July 28, 1959

2,896,940
COIL SPRING LOWERING AND STABILIZING DEVICES

Jose A. Lightbourn, El Paso, Tex.

Application August 29, 1958, Serial No. 757,996

8 Claims. (Cl. 267—20)

This invention relates to improvements in stabilizing and lowering devices for application to automobile coil spring wheel suspensions so as to improve the safety, handling characteristics, and appearance of automobiles.

The primary object of the invention is to provide devices of this kind which are simple in construction, more efficient, and more easily installed and adjusted, and which are especially suited to be marketed in service stations, garages, and automobile accessory stores as kits capable of being installed by automobile owners having a minimum of mechanical skill and facilities.

Another object of the invention is to provide devices of the character indicated above which involve clamp means, applicable to either the upper or the lower spring seats of coil suspensions, and acting to adjustably compress together two more adjacent convolutions of the coil springs so as to de-activate such convolutions and thereby reduce the heights of the springs and reduce the vertical amplitudes of action of the springs, and lower the associated automobile.

A further object of the invention is to provide devices of the character indicated above which include, in addition to the clamp means, spacer means to be used in conjunction with the clamp means for adjusting the spacing of adjacent ones of the unclamped convolutions in order to restore the normal height of the associated automobile above the ground, where lowering of the automobile is not desired.

Other important objects and advantageous features of the invention will be apparent from the following description and the accompanying drawings, wherein, for purposes of illustration only, a specific form of the invention is set forth in detail.

In the drawings:

Figure 4 is a fragmentary front elevation of another form of coil spring wheel suspension wherein the shock absorber is located within the coil spring, and showing another device of the invention installed;

Figure 5 is a view similar to Figure 2 showing employment of spacer means for clamped convolutions of the coil spring, and showing a supplemental clamp plate added to the lower spring seat;

Figure 6 is a fragmentary view similar to Figure 5, showing another supplemental clamp plate added to the lower spring seat to take clamp bolts;

Figure 7 is a view similar to Figure 6 of another form of suspension wherein the coil spring is canted rearwardly relative to the lower spring seat and special clamp bolt washers are used on the clamp bolts; and Figure 8 is a perspective view of a spring convolution spacer.

Figure 1:
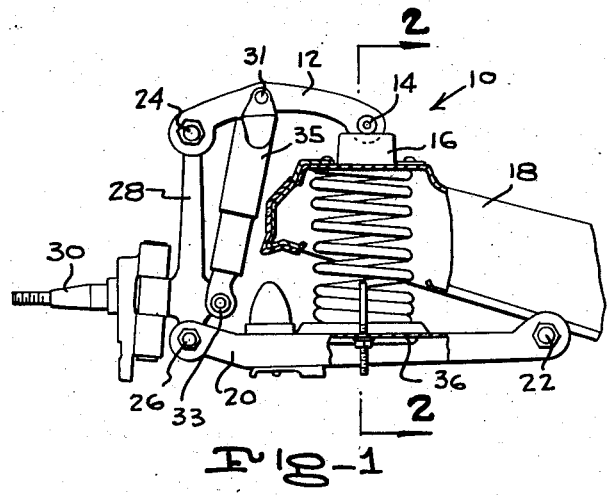
Figure 1 is a fragmentary front elevation of one form of automobile coil spring wheel suspension, partly broken away and in section, and showing a device of the invention installed.
Figure 2:
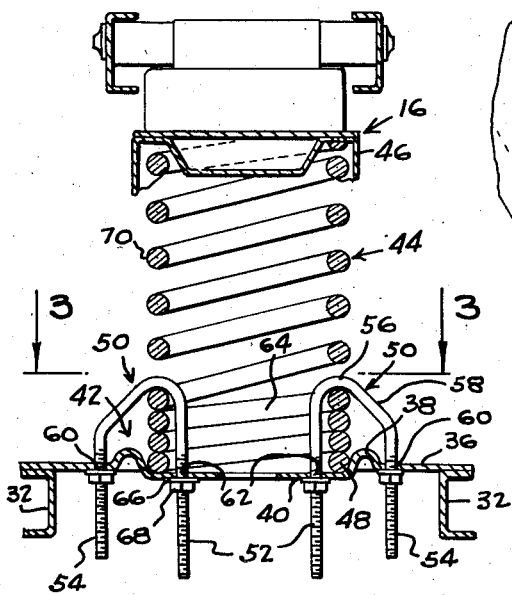
Figure 2 is an enlarged vertical transverse section taken on the line 2—2 of Figure 1.
Figure 3:
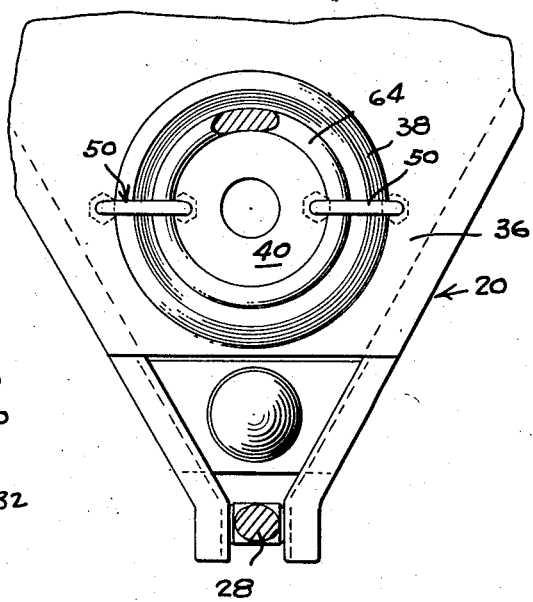
Figure 3 is a fragmentary horizontal section taken on the line 3—3 of Figure 2.

Referring in detail to the drawings, wherein like or similar numerals designate like parts throughout the several views, and first to Figure 1 to Figure 3, the numeral 10 generally designates an automobile coil spring wheel suspension, of substantially conventional character, involving an upper control arm 12 which is pivoted at its inboard end at 14 on an upper spring seat 16 on a chassis member 18, and a lower control arm 20 which is pivoted at its inboard end at 22 on the chassis member 18. The upper and lower control arms are pivoted at their outboard ends at 24 and 26, respectively, to the upper and lower ends of a steering knuckle 28 having a wheel spindle 30 thereon.

Extending between and pivoted at its upper and lower ends, as indicated at 31 and 33, respectively, to the upper control arm 20 and the steering knuckle 28, is a vertical tubular shock absorber 35, which is located between the knuckle 28 and the chassis member 18. The lower control arm 20 involves laterally spaced bars 32 upon and between which is fixed a lower spring seat plate 36 formed with an upstanding annular ridge 38 and a relatively wide annular flange 40 within the ridge 38. The ridge 38 and the annular flange together constitute the lower spring seat 42.

A perpendicular vertical coil suspension spring 44 has its upper end seated in the channel 46 of the upper spring seat 16, and its lowermost convolution 48 seated in the lower spring seat 42.

Two similar substantially U-shaped inverted clamp bolts 50 have relatively long inner legs 52 and shorter outer legs 54, and bight portions which have arcuate inner portions 56 and outwardly declining relatively straight outer portions 58. Diametrically opposed outer bolt leg receiving holes are provided through the lower spring seat plate 36 at the front and rear sides of and outside of the seat 42, as indicated at 60, and diametrically opposed inner bolt leg receiving holes are provided through the flange 40, as indicated at 62, which are aligned with the holes 60.

The clamp bolts 50 are installed by passing the bight portions thereof over a selected convolution 64 of the spring 44 spaced above the lowermost convolution 64 of the spring 44 spaced above the lowermost convolution 48, and then passing the inner and outer legs downwardly through the inner and outer bolt holes, and then applying washers 66 and nuts 68 on the lower ends of the legs, and tightening the nuts against the undersides of the plate 36 and the flange 40.

The nuts 68 are tightened to the degree necessary to produce the desired compression together of the spring convolutions 48 and 64, and any intervening convolutions, less than a touching relation of these convolutions or, as shown in Figure 2, a full touching relation of these convolutions with each other. It is obvious that the spring convolutions 70 above the compressed convolutions and the bolts 50 remain free to flex, but that the overall height of the spring 44 is reduced, so as to lower the associated automobile, and so as to desirably reduce the effective vertical amplitude of the spring 44, and thereby improve the stability of and the cornering characteristics of the automobile.

As shown in Figure 5, full clamping of selected lower convolutions of the spring 44 can be utilized, along with adjustment of the overall height of the spring 44, as for restoring the normal height of an automobile above the ground, by the use of spacer blocks engaged between adjacent compressed convolutions, as hereinafter described in detail.

The form of coil spring suspension shown in Figure 4, and generally designated 10a, is the same as that of Figures 1 to 3, except that the vertical tubular shock absorber 35a is located within the coil spring 44a, and its upper end is secured to a part of the upper spring seat 16a, in a conventional arrangement. Clamp bolts 50a are installed and applied as above described, to lower convolutions of the spring 44a and to the lower spring seat 42a.

The form of coil spring suspension shown in Figure 5, and generally designated 10b, is the same as that shown in Figure 2, except that the lower spring seat flange 40b is of channel form and is narrower than the flange 40 of Figure 2, and concaved, and is not wide enough to accommodate the inner legs 52b of the clamp bolts 50b. Because of this, a supplemental clamp plate or disc 80 is provided, which is somewhat larger in diameter than the aperture of the narrow flange 40b, and is positioned in this aperture with the peripheral edge 82 of the supplemental plate 80 bearing against the underside of the narrow flange 40b near the free edge 84 of the narrow flange 40b. The supplemental clamp plate 80 is provided with inner bolt leg receiving holes, through which the inner legs 52b of clamp bolts 50b are passed downwardly and secured with nuts 68b in the manner above described.

The form of coil spring suspension shown in Figure 6, and generally designated 10c, is the same as that shown in Figure 5, except that the supplemental clamp plate or disc 80c is larger in diameter than the plate 80, and has a channel edge 81c which is engaged around the bottom of a narrow channel flange 40c, instead of with the underside thereof near its free edge 84c.

The form of the coil spring suspension shown in Figure 7, and generally designated 10d has a rearwardly canted coil spring 44d engaged at its upper end in an upper seat 16d, and engaged at its lower end in a lower seat assembly which involves a horizontal plate 36d having a rearwardly declining seat 42d. Because of the angular divergence of the plate 36d and the seat flange 40d, bevelled spacers 86 are provided on the outer legs 54d of clamp bolts 50d for flush engagement with the underside of the plate 36d at opposite sides of the seat 42d, so that the bolts 5d have their legs at the necessary rearwardly canted angles parallel to the axis of the spring 44d.

The spring convolution spacer 90, shown in Figure 8, comprises an elongated, generally rectangular solid block 92, of suitable compressible material, such as hard rubber, and having concave longitudinal grooves 94 in upper and lower sides, which conform in contour to and conformably receive adjacent sides of adjacent convolutions of a coil spring, for spacing adjacent convolutions from each other and tensioning adjacent convolutions away from each other when under compression by clamp bolts, as shown in Figures 5 and 7.

It is to be noted that while the invention has been described herein in different forms as involving lower spring seats and lower convolutions of coil springs, that the clamp means can be effectively installed on and applied to upper spring seats and upper convolutions of coil springs.

Although there has been shown and described herein a preferred form of the invention, it is to be understood that the invention is not necessarily confined thereto, and that any change or changes in the structure of and in the relative arrangement of components thereof are contemplated as being within the scope of the invention as defined by the claims appended hereto.

What is claimed is:

1. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of the spring adjacent to said one seat member, some of said limited convolutions being in contact with each other, and spacer means being engaged between and spacing others of the limited convolutions from each other.

2. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of the spring adjacent to said one seat member, said clamp means comprising a bolt means embracing the limited number of convolutions and secured to said one seat member, said bolt means comprising a pair of diametrically opposed inverted U-shaped bolts having inner and outer legs secured to the seat member at the inner and outer sides of diametrically opposed portions of the limited convolutions, and bight portions embracing a convolution remote from the end of the coil spring engaged with the seat member, said one spring seat member comprising a seat plate having an annular seat thereon including an annular ridge and a lateral annular flange within the ridge, the inner legs of the bolts being connected to the flange and the outer legs of the bolts secured to the seat plate.

3. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of the spring adjacent the said one seat member, said clamp means comprising a bolt means embracing the limited number of convolutions and secured to said one seat member, said bolt means comprising a pair of diametrically opposed inverted U-shaped bolts having inner and outer legs secured to the seat member at the inner and outer sides of diametrically opposed portions of the limited convolutions, and bight portions embracing a convolution remote from the end of the coil spring engaged with the seat member, said one spring seat member comprising a seat plate having an annular seat thereon including an annular ridge and a lateral annular flange within the ridge, the inner legs of the bolts being connected to the flange and the outer legs of the bolts secured to the seat plate, and means connecting the inner bolt legs to said flange comprising a supplemental plate to which the inner bolt legs are secured, said supplemental plate being securably engaged with the underside of said flange.

4. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of the spring adjacent to said one seat member, said clamp means comprising a bolt means embracing the limited number of convolutions and secured to said one seat member, said bolt means comprising a pair of diametrically opposed inverted U-shaped bolts having inner and outer legs secured to the seat member at the inner and outer sides of diametrically opposed portions of the limited convolutions, and bight portions embracing a convolution remote from the end of the coil spring engaged with the seat member, said one spring seat member comprising a seat plate having an annular seat thereon including an annular ridge and a lateral annular flange within the ridge, the inner legs of the bolts being connected to the flange and the outer legs of the bolts secured to the seat plate, and means connecting the inner bolt legs to said flange comprising a supplemental plate to which the inner bolt legs are secured, said supplemental plate being securably engaged with the underside of said flange, said flange being a channel flange having a convex bottom and a free edge, and the supplemental plate having a peripheral edge portion engaged with the underside of the flange at a point close to the free edge of the flange.

5. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of the spring adjacent to said one seat member, said clamp means comprising a bolt means embracing the limited number of convolutions and secured to said one seat member, said bolt means comprising a pair of diametrically opposed inverted U-shaped bolts having inner and outer legs secured to the seat member at the inner and outer sides of diametrically opposed portions of the limited convolutions, and bight portions embracing a convolution remote from the end of the coil spring engaged with the seat member, said one spring seat member comprising a seat plate having an annular seat thereon including an annular ridge and a lateral annular flange within the ridge, the inner legs of the bolts being connected to the flange and the outer legs of the bolts secured to the seat plate, said flange being a channel flange having a convex bottom and a free edge, means connecting the inner bolt legs to said flange comprising a supplemental plate to which the inner bolt legs are secured, and said supplemental plate having a concave peripheral edge portion engaging and embracing the convex bottom of the channel flange.

6. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of said spring adjacent the said one seat member some of said limited convolutions being in contact with each other, and spacer means being engaged between and spacing others of the limited convolutions from each other, said spacer means comprising a block having concave grooves in its upper and lower sides conformably receiving the facing sides of adjacent ones of said other limited convolutions.

7. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of said spring adjacent the said one seat member, some of said limited convolutions being in contact with each other, and spacer means being engaged between and spacing others of the limited convolutions from each other, said spacer means comprising a pair of blocks having concave grooves in their upper and lower sides conformably receiving the facing sides of adjacent ones of said other limited convolutions, the blocks being disposed at diametrically opposed sides of the spring.

8. A coil spring automobile wheel suspension comprising a chassis member, upper and lower control arms pivoted on said member, an upper spring seat member mounted on said chassis member, a lower spring seat member on said lower control arm, a vertical coil spring having an upper end engaged in said upper seat member and the lower end engaged in said lower seat member, and clamp means applied to one of said spring seats and engaging and compressing together a limited number of convolutions of said spring adjacent the said one seat member, said clamp means comprising a bolt means embracing the limited number of convolutions and secured to said one seat member, said bolt means comprising a pair of diametrically opposed inverted U-shaped bolts having inner and outer legs secured to the seat member at the inner and outer sides of diametrically opposed portions of the limited convolutions, and bight portions embracing a convolution remote from the end of the coil spring engaged with the seat member, said one spring seat member comprising a seat plate having an annular seat thereon including an annular ridge and a lateral annular flange within the ridge, the inner legs of the bolts being connected to the flange and the outer legs of the bolts secured to the seat plate, the coil spring being canted relative to the perpendicular and the seat flange similarly angled relative to the seat plate, the legs of the bolts being parallel to the axis of the coil spring and at angles to the seat plate, said legs traversing the flange and the seat plate, nuts threaded on the legs beneath the flange and the seat plate, and beveled spacers on the outer legs and compressed between the nuts and the undersides of the seat plate.

References Cited in the file of this patent

UNITED STATES PATENTS

| | | |
|---|---|---|
| 964,651 | Kirk | July 19, 1910 |
| 1,033,429 | Magner | July 23, 1912 |
| 1,646,151 | Kennedy | Oct. 18, 1927 |
| 2,661,206 | Gregoire | Dec. 1, 1953 |
| 2,678,210 | Reuter | May 11, 1954 |
| 2,801,841 | Blythe | Aug. 6, 1957 |

FOREIGN PATENTS

| | | |
|---|---|---|
| 431,727 | Great Britain | July 15, 1935 |
| 591,334 | Great Britain | Aug. 14, 1947 |